United States Patent
Rugolo et al.

(10) Patent No.: US 11,456,606 B2
(45) Date of Patent: Sep. 27, 2022

(54) BATTERY CHARGING CASE

(71) Applicant: Iyo Inc., Redwood City, CA (US)

(72) Inventors: Jason Rugolo, San Francisco, CA (US); Haden Cory, Mountain View, CA (US)

(73) Assignee: Iyo Inc., Redwood City, CA (US)

( * ) Notice: Subject to any disclaimer, the term of this patent is extended or adjusted under 35 U.S.C. 154(b) by 487 days.

(21) Appl. No.: 16/374,213

(22) Filed: Apr. 3, 2019

(65) Prior Publication Data

US 2020/0321791 A1  Oct. 8, 2020

(51) Int. Cl.
*H02J 7/00* (2006.01)
*H02J 7/02* (2016.01)
*H04R 1/10* (2006.01)

(52) U.S. Cl.
CPC ............ *H02J 7/0045* (2013.01); *H02J 7/007* (2013.01); *H02J 7/025* (2013.01); *H04R 1/1016* (2013.01); *H04R 1/1025* (2013.01)

(58) Field of Classification Search
CPC .......... H02J 7/0045; H02J 7/007; H02J 7/025; H04R 1/1016
USPC .......................................... 320/107, 113, 115
See application file for complete search history.

(56) References Cited

U.S. PATENT DOCUMENTS

| | | | | |
|---|---|---|---|---|
| 7,016,512 | B1 | 3/2006 | Feely et al. | |
| 8,126,177 | B2 * | 2/2012 | Jensen ................... | H04R 25/00 381/322 |
| 8,253,377 | B2 * | 8/2012 | Meincke ............... | H04R 25/602 320/115 |
| 8,548,174 | B2 | 10/2013 | Dufresne et al. | |
| 9,973,840 | B2 * | 5/2018 | Wagman ............... | H04B 5/0037 |
| 10,805,706 | B2 * | 10/2020 | Jeong ................... | H04R 1/1025 |
| 11,172,280 | B2 * | 11/2021 | Cohen .................. | H04R 1/1016 |
| 2015/0382123 | A1 | 12/2015 | Jobani | |
| 2017/0093079 | A1 * | 3/2017 | Wagman ............... | H04R 1/1041 |
| 2019/0089187 | A1 * | 3/2019 | Konomi ................ | H02J 7/0044 |
| 2019/0124431 | A1 * | 4/2019 | Jeong ................... | H04R 1/1025 |
| 2020/0304898 | A1 * | 9/2020 | Cohen .................. | H04R 1/1016 |

OTHER PUBLICATIONS

AirPods, Retrieved from Internet <www.apple.com_airpods>, Jan. 15, 2019, Apple, 1 page.
myCharge PowerGear Tunes Protective Charging Case for Earbuds Headphones (1000 mAh/1A Output), Retrieved from Internet <https://www.amazon.com/myCharge-PowerGear-Protective-Charging-Headphones/dp/B077T39TSY/ref=sr_1_fkmrnull_1?keywords=myCharge+PowerGear+Tunes+Protective+Charging+Case+for+Earbuds+Headphones+%281000+mAh%2F1A+Output%29&qid=1554310254&s=gateway&sr=8-1-fkmrnull> Jan. 15, 2019, 7pages.

(Continued)

*Primary Examiner* — Richard V Muralidar
(74) *Attorney, Agent, or Firm* — Nicholson De Vos Webster & Elliott LLP

(57) ABSTRACT

A system for charging in-ear device battery packages includes a housing with a lid and a body, and a hinge system attaching the lid to the body. A charging unit is shaped to fit in the body, and includes a battery. One or more slots are disposed in the body that are exposed when the lid is open. The one or more slots are shaped to receive one or more of the in-ear device battery packages, and charge the one or more in-ear device battery packages with energy stored in the battery.

18 Claims, 6 Drawing Sheets

(56) References Cited

OTHER PUBLICATIONS

Zackees Rechargeable USB Coin Cell Charger for LIR2032/LIR2450/LIR2016. LIR2032 (LR2032) Batteries Included, LIR2032 Replaces CR2032 Batteries, Retrieved from Internet <https://www.amazon.com/Zackees-Rechargeable-LIR2016-Batteries-batteries/dp/B01BA1CLN6/ref=sr_1_3?keywords=Zackees+Rechargeable+USB+Coin+Cell+Charger&qid=1554310335&s=gateway&sr=8-3> Jan. 15, 2019, 10pages.

U.S. Appl. No. 16/176,660, Modular In-Ear Device, filed Oct. 31, 2018, 24 pages.

U.S. Appl. No. 16/234,999, Tympanic Membrane Measurement, filed Dec. 28, 2018, 31 pages.

U.S. Appl. No. 16/235,360, Transparent Sound Device, filed Dec. 28, 2018, 29 pages.

U.S. Appl. No. 16/235,417, Open-Canal In-Ear Device, filed Dec. 28, 2018, 23 pages.

U.S. Appl. No. 16/235,092, Optical Otoscope Device, filed Dec. 28, 2018, 27 pages.

\* cited by examiner

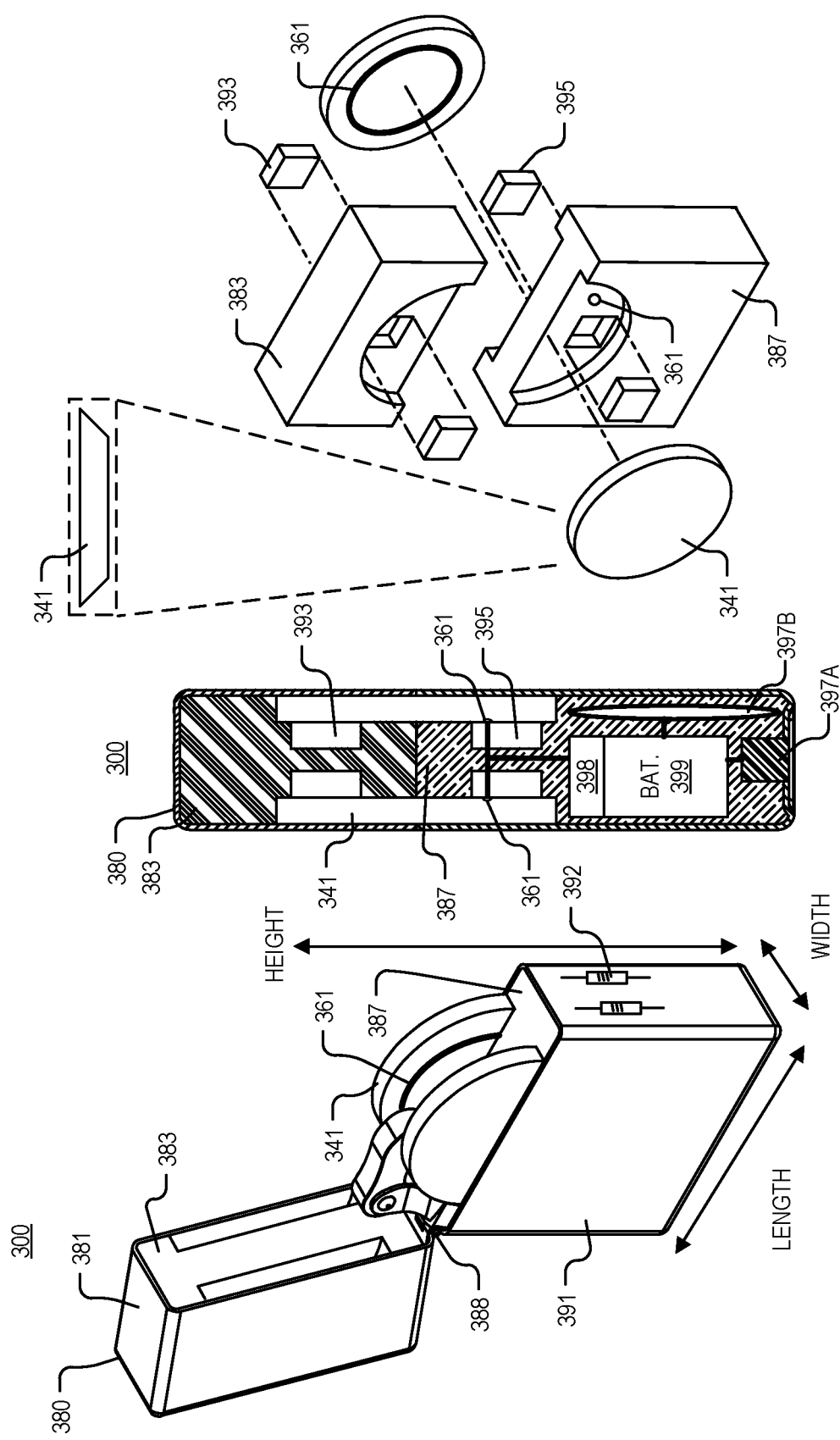

BATTERY CHARGING CASE

TECHNICAL FIELD

This disclosure relates generally to battery charging.

BACKGROUND INFORMATION

Headphones are a pair of loudspeakers worn on or around a user's ears. Circumaural headphones use a band on the top of the user's head to hold the speakers in place over or in the user's ears. Another type of headphones are known as earbuds or earpieces and consist of individual monolithic units that plug into the user's ear canal.

Both headphones and earbuds are becoming more common with increased use of personal electronic devices. For example, people use headphones to connect to their phones to play music, listen to podcasts, etc. However, these devices can be very expensive to achieve high quality sound. If monolithic devices break or wear out, the user needs to buy a new pair.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 3A-3C illustrate a system, or part of a system, for charging the battery package included in the in-ear device of FIGS. 2A-2C, in accordance with an embodiment of the disclosure.

DETAILED DESCRIPTION

Figure 1:
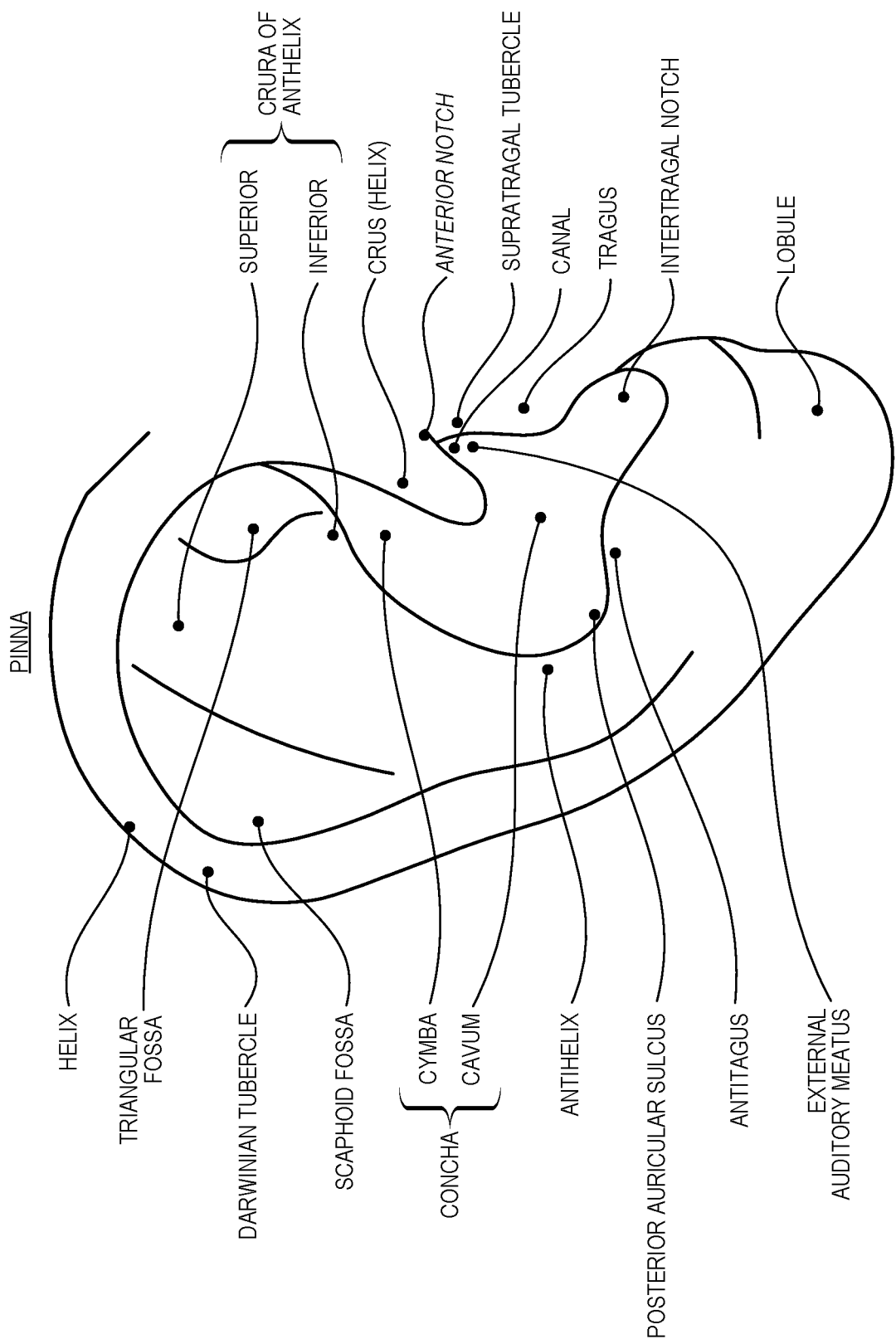
FIG. 1 is a cartoon illustration of human ear anatomy.

Embodiments of a system, apparatus, and method for charging a modular in-ear device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Generally, ear-worn monitors are useful for displaying sounds to the human ear while on the go. Music, directions, digital assistants, and ambient sound modification are all things people desire. Often times, high quality sound augmentation can only be achieved when you can properly eliminate natural sounds. For example, to "delete" the loud train noise from your perceived audio field, you must be able to occlude it or actively cancel it. One way to cancel sound is with mechanical occlusion. However, canal-occluding devices (e.g., earbuds) may be uncomfortable and cannot be worn all the time because of "hot spots" that develop from the imperfect one-size-fits-all interference fit with the ear canal. Further, they may not provide enough occlusion in loud environments where sound occluding devices must be worn for extended periods of time, (e.g., professional music, construction, etc.).

It is possible to create single piece hard (e.g., hard plastic) headphones having the geometry of your outer ear and making a custom fitting device which is both more occluding and more comfortable to wear for a long period. However, these single piece devices may be expensive, difficult to take in and out, and are more likely to get "gunked up" by cerumen and sebum, the ear canal waxes and oils. Here, a modular headphone design is proposed to eliminate these problems, along with a charging system for recharging the headphone battery package.

The first part of the modular headphone is a custom ear molding soft polymer interface. The molding is made by obtaining the ear geometry, generating the optimal surface shape digitally, and manufacturing a "sleeve" for the audio package (described later). This molding may be very inexpensive, produced of a soft biocompatible material like silicone, and be replaced upon degradation. After the initial measurements are taken, the user may reorder new moldings at little cost (e.g., the moldings may be 3D printed) once the moldings are worn down or "gunked up".

The second part is the audio package, which may include balanced armature-type components (or other speaker devices) that fit in a pocket within the soft polymer custom ear molding. This part can be mass produced, reducing costs substantially, and increasing reliability. This part may be somewhat expensive, but also will likely be the longest lived part in the device, and its modularity is important for cost savings as one continues to upgrade their in-ear device.

The third part is an electronics package (which in some embodiments, may be a "battery package"), that "snaps" onto the outside of the audio package. This package can take the shape of a "coin", be magnetically attached to the audio package with electrical contact pins, and contain other electronics, including but not limited to radios, audio processing ASICs, microphones, amplifiers, microprocessors, and a battery. This electronic "coin" can be easily removed and charged. Via mass production, enabled by the modular nature of this concept, the electronics package could conceivably be inexpensive enough to have two pairs on your person. Thus, in this embodiment, thinness can be preserved as battery life only needs to be half of a normal wearing time. Further, as algorithms, batteries, and custom audio processing integrated circuits improve, this part can be updated without new ear scans, custom manufacturing, or pricey audio driver replacement.

Thus, embodiments of this modular device allow the user to use, and regularly replace, a soft comfortable custom ear piece at minimal cost. The device also allows the user to upgrade the hardware/firmware of the device at minimal cost, since the "smarts" of the device may be included in a separate detachable electronics package that can be mass produced. The device lets the user keep and reuse the most expensive (and least likely to break or become technologically obsolete) portion of the in-ear device: the audio package. Additionally, the user may carry around multiple electronics/battery packages functionally extending the battery life of the in-ear device by being able to swap out expended batteries for fully charged batteries. The multiple electronic/battery packages may be carried around in a small charging apparatus that is sized to fit in the user's pocket (e.g., like a pack of gum). Thus, when the user's headphones run out of charge, the user may swap out the battery package for a new fully charged battery package, which minimally interrupts the user's listening experience.

The following disclosure will describe the embodiments discussed above, and other embodiments, as they relate to the figures.

FIG. 1 is a cartoon illustration of human ear anatomy. The anatomy depicted may be referenced in connection with how the in-ear device (see e.g., FIG. 2) fits inside the ear. Shown is the outer ear (pinna) and the location of the helix, triangular fossa, Darwinian tubercle, scaphoid fossa, concha (including the cymba and cavum), antihelix, posterior auricular sulcus, antitagus, external auditory meatus, crura of anthelix (both superior and inferior), crus, anterior notch, supratragal tubercle, canal, tragus, intertragal notch, and lobule.

Figure 2A:
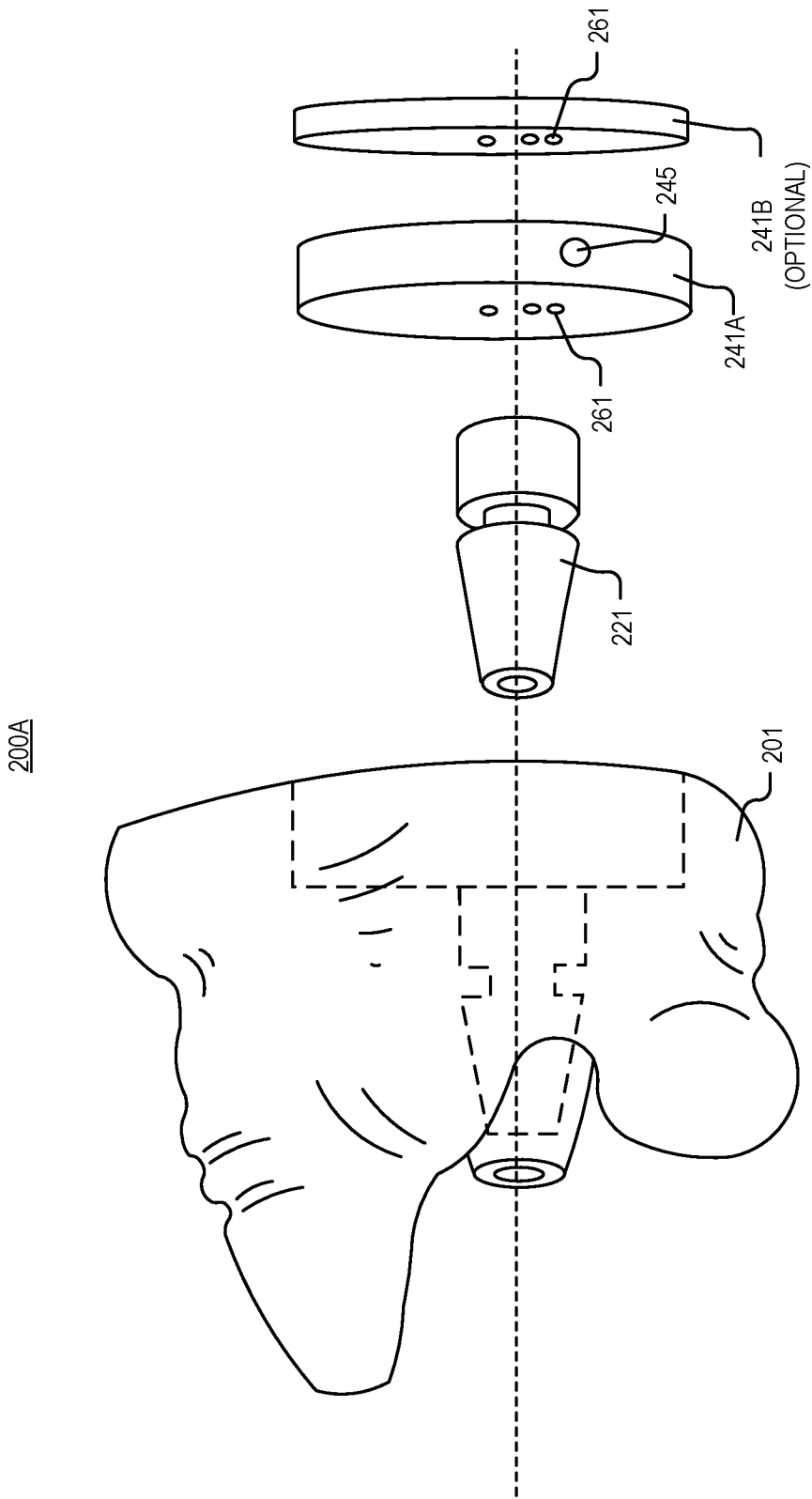
FIG. 2A illustrates a modular in-ear device, in accordance with an embodiment of the disclosure.

FIG. 2A illustrates a modular in-ear device 200A, in accordance with an embodiment of the disclosure. The depicted embodiment shows molding 201, audio package 221, electronics package 241A (which is one embodiment of a "battery package" since it may include a battery), and (optional) second, or additional, battery package 241B. Battery package 241B may be a stand-alone battery package (to power electronics package 241A if electronics package 241A doesn't contain a battery) or may be an additional battery package to extend length of use by connecting additional power storage to electronics package 241A. However, one of skill in the art will appreciate that there may be additional modular components, or that the components shown may be divided into sub components, in accordance with the teachings of the present disclosure. There may be one in-ear device 200A for each ear (e.g., two in-ear devices 200A may be sold as a set).

As shown, molding 201 is shaped to hold in-ear device 200A in the pinna (outer ear depicted in FIG. 1) and occlude the canal, since it is custom shaped to the user's ear (e.g., by forming a silicon mold of the user's ear, taking optical measurements of the user's ear, or the like). It is appreciated that a custom shaped device is any device where measurements have been taken to fit the device to the user's ear. Audio package 221 is configured to emit sound and structured to removably attach to molding 201. Here, audio package 221 fits within a hollowed out portion (e.g., an enclosure) of the molding, and is mechanically held in place by the soft polymer ridge fitting into the groove in audio package 221; however, one of skill in the art will appreciate that other mechanical attachment techniques may be used to hold audio package 221 in place (e.g., interference fit, snaps, or fasteners). Moreover, in some embodiments, other attachment mechanisms such as magnets or the like may be used to hold audio package 221 in molding 201.

In some embodiments, audio package 221 is sealed in a housing (e.g., plastic molding or the like) to prevent ingression of water, and substances from the ear, into the audio electronic components. However, there may be a hole from which sound is emitted. Electronics in audio package 221 may be fully sealed so that only the sound emitting portions are exposed to the ear.

Depicted here, battery packages 241A and 241B are substantially coin shaped, and includes electrodes 261 to couple to other electrodes on audio package 221 and electronics/battery package 241A, respectively. However, in other embodiments, battery packages 241A and 241B may not be substantially coin shaped and take other configurations (e.g., square, oval, hexagonal, abstract shaped, or the like). Electronics/battery package 241A is structured to removably couple to audio package 221 (e.g., magnetically—using neodymium, iron, or the like; physically—using friction, snap, or Velcro adhesion; chemically—with a releasable polymer or the like) and removably attach to molding 201. Battery package 241B is structured to clip to battery package 241A using the same or similar techniques. Battery packages 241A and 241B may attach to molding 201 by only adhering to audio package 221 (which has already been attached to molding 201, thereby "attaching" battery packages 241A and 241B to molding 201). However, in other embodiments, battery packages 241A and 241B may both attach to audio package 221, and physically attach to molding 201 (e.g., fitting within the substantially coin-shaped recess of molding 201). Like audio package 221, in some embodiments, battery packages 241A and 241B may be sealed in a discrete housing (separate from the housing of audio package 221) to prevent ingression of water and substances from the ear. This way the electronics in electronics packages 241A and 241B do not corrode or fail.

Figure 2B:
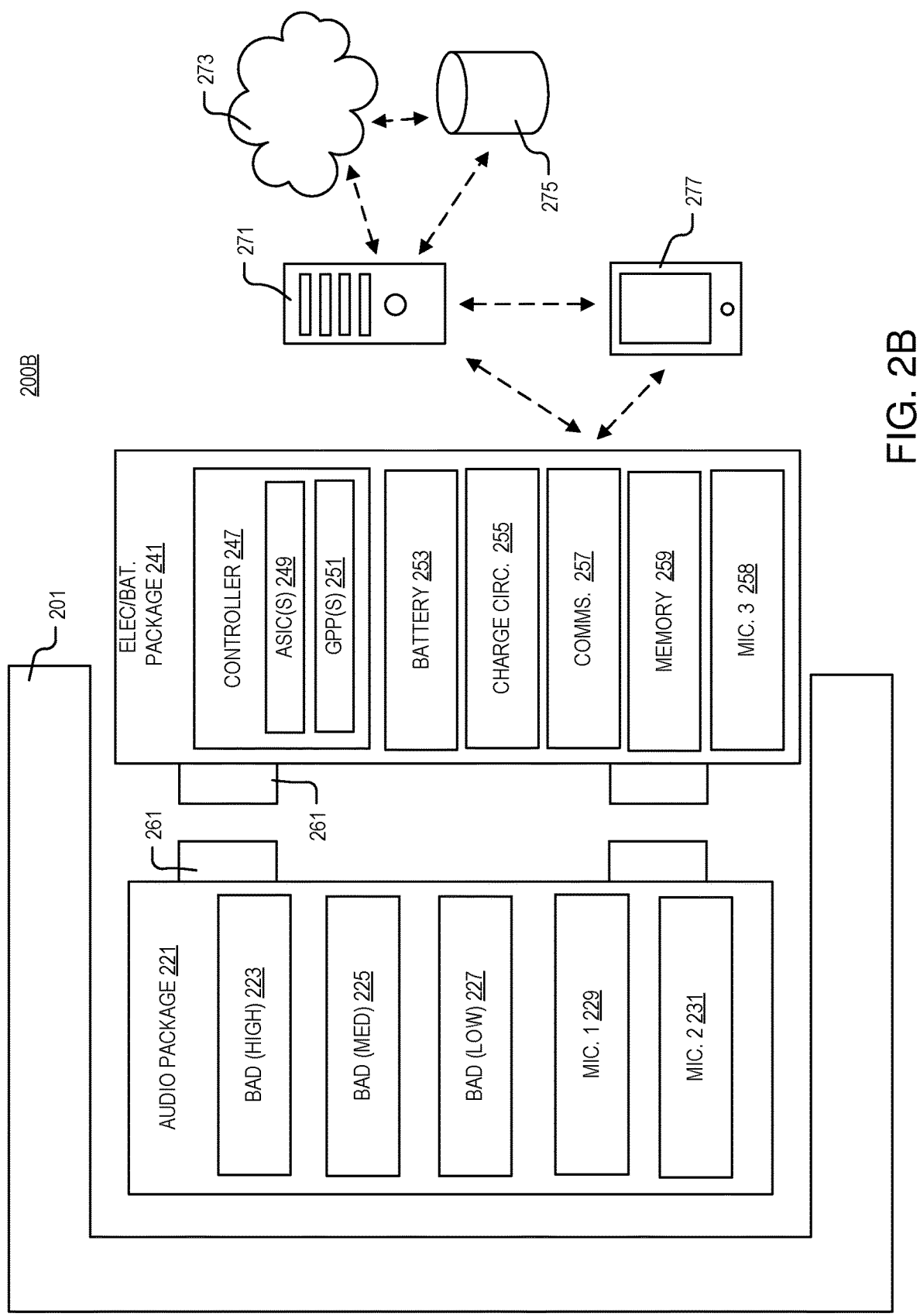
FIG. 2B illustrates a block diagram of the modular in-ear device of FIG. 2A, in accordance with an embodiment of the disclosure.

FIG. 2B illustrates a block diagram of the modular in-ear device 200B of FIG. 2A (without optional battery package 241B), in accordance with an embodiment of the disclosure. One of ordinary skill in the art will appreciate that this is merely a cartoon illustration, and that the devices depicted are not drawn to scale (and not shown as their actual shape). Moreover, all of the electronic components in a piece of device architecture (e.g., audio package 221) are electrically coupled. The devices depicted may have additional or fewer components, in accordance with the teachings of the present disclosure.

Like FIG. 2A, depicted are molding 201, audio package 221, and electronics/battery package 241. As shown, audio package 221 includes audio electronics such as one or more (three) balanced armature drivers (BADs)—a device that produces sound by vibrating a "reed" using an electromagnetic field—including a high-range BAD 223, a mid-range BAD 225, and a low range BAD 227 to produce high, medium, and low pitches, respectively. However, in other embodiments other sound emitting devices may be used (e.g., cone/coil based speakers, or the like). Audio package 221 also includes one or more microphones (e.g., MIC. 1 229, MIC. 2 231) which may have different sized diaphragms, materials, orientations (e.g., one facing towards the external world, and one facing toward the user's ear canal). Microphones 229 and 231 may be used to record external sounds, and in response to receiving the external sound data with controller 247, the in-ear device may emit sound from audio package to reduce a magnitude (e.g., through destructive interference of the sound waves) of the external sound received by the ear drum in the user's ear. It is appreciated that the device herein may not only cancel sound, but amplify select sounds, provide on-demand sound transparency (e.g., recognize sounds and let them "pass though" the device as if they were heard naturally), translate language, provide virtual assistant services (e.g., the headphones record a question, send the natural language data to cloud 273 for processing, and receive a natural language answer to the question), or the like. As stated, one or more of microphones 229 and 231 may be canal microphones (e.g., facing into the ear canal to receive sound in the ear canal such as speech or other sounds generated by the user). The canal microphones may be used to receive the user's speech (e.g., when in-ear device 200B is used to make a phone call) and transmit the recorded sound data to an external device. Canal microphones may also be used for noise cancelation and noise transparency functionality to detect noises made by the user (e.g., chewing, breathing, or the like) and cancel these noises in the occluded (by in-ear device 200) ear canal. It is appreciated that user generated noises can seem especially loud in an occluded canal, and accordingly, it may be desirable to use noise cancelation technologies described herein to cancel these sounds in addition to external sounds.

Electronics (and battery) package 241 includes a controller 247, which may include one or more application-specific integrated circuits (ASICs) 249 to handle specific signal processing tasks, and/or one or more general purpose processors (GPPs) 251. Controller may include logic (e.g., implemented in hardware, software, on the cloud/across a distributed system, or a combination thereof) that when executed by the controller causes the in-ear device to perform a variety of operations. Operations may include playing music/audio, performing noise cancelation computations, or the like. Battery 253 (e.g., a lithium-ion battery or the like) or other energy storage device (e.g., capacitor) is also included in electronics package 241 to provide power to controller 247 and other circuitry. Charging circuitry 255 (e.g., inductive charging loop, direct plug in, or the like) is coupled to battery 253 to charge battery 253. Communications circuitry 257 (e.g., transmitter, receiver, or transceiver) is coupled to communicate with one or more external devices (e.g., wireless router, smart phone, tablet, cellphone network, etc.) via Wi-Fi, Bluetooth, or other communication protocol. In the depicted embodiment, electronics package 241 also includes one or more microphones (e.g., MIC. 3 258). This may serve the same purpose as the microphones in audio package 221: record sounds for uploading to an external device, noise cancellation functionality, or noise transparency functionality. It is appreciated that many of the same electronic devices may be included in both audio package 221 and electronics package 241, and that the electronic devices may be combined in any suitable manner, in accordance with the teachings of the present disclosure.

As stated above, controller 247 may be programmed with logic in memory (or be coupled to remote logic) that performs real time, or near real time, noise cancelation, sound transparency, and sound augmentation functions. For example, local or remote logic may include machine learning algorithms (e.g., a neural network trained to recognize specific sound features, recurrent neural network, long short-term memory network, or the like), and other computational techniques (e.g., heuristics and thresholding), which may be used individually and in combination to recognize specific sounds and cancel or amplify these sounds. For example, the user may select never to hear a car horn honk again, unless its proximity is very close (e.g., as measured by volume or other technique). The machine learning model (and other algorithms) will be trained to filter and suppress car horns unless it detected that the sound was within a threshold proximity of the user. Or if the user wanted to tune out a conversation, the user could prevent themselves from hearing the conversation, except if a certain word or phrase was spoken, then the system here could selectively pass that portion of the conversation through (e.g., smart cancelation of certain sounds). In some embodiments, the system my perform real time, or near real time, translation (e.g., where the user doesn't hear a third party speaking in Spanish, but instead hears the words in English in their ear). Processing of this sound modification functionality could occur locally, on the cloud, or a combination thereof, depending on the processing requirements and the hardware available.

The system may also include logic to "pass" sounds in a way that they retain their spatial information (e.g., so the user knows which direction the sound is coming from)—information that is often lost when wearing occluding devices. Similarly, the system may cancel sound generated by the user (e.g., chewing, breathing, etc.) which is often perceived louder when the ear canal is closed. As stated above, users may select which sounds/noises they would like to hear, and which ones to remove using a user interface, described below. In one embodiment this may be from a list of common noises, or noises specific to the user.

In the depicted embodiment, electronics package 241 includes one or more electrodes 261, which may be used to connect electronics package 241 to audio package 221. Audio package 221 may have magnets with complementary orientation (e.g., N to S) to magnets on battery package 241, so that when placed together, audio package 221 and battery package 241 automatically align. This allows audio package 221 and electrical package 241 to electrically couple and communicate. In some embodiments, the protruding electrodes 261 may be spring loaded and retract into their respective package when the packages are not in contact. It is appreciated that electrodes 261 on battery package 241 may be used to not only communicate with audio package 221 but also to receive charge from a charging system (see e.g., FIG. 3A).

As shown, communication circuitry 257 may communicate with a smart phone/tablet 277 or other portable electronic device, and/or one or more servers 271 and storage 275 which are part of the "cloud" 273. Data may be transmitted to the external devices from in-ear device 200, for example, recordings from microphones 229/231 may be sent to smart phone 277 and uploaded to the cloud. Conversely, data may be downloaded from one or more external devices; for example, music may be retrieved from smart phone 277 or directly from a Wi-Fi network (e.g., in the user's house). The smart phone 277 or other remote devices may be used to interact with, and control, in-ear device 200 manually (e.g., through a user interface like an app) or automatically (e.g., automatic data synch). In some embodiments, the one or more external devices depicted may be used to perform calculations that are processor intensive and send the results back to the in-ear device 200.

Figure 2C:
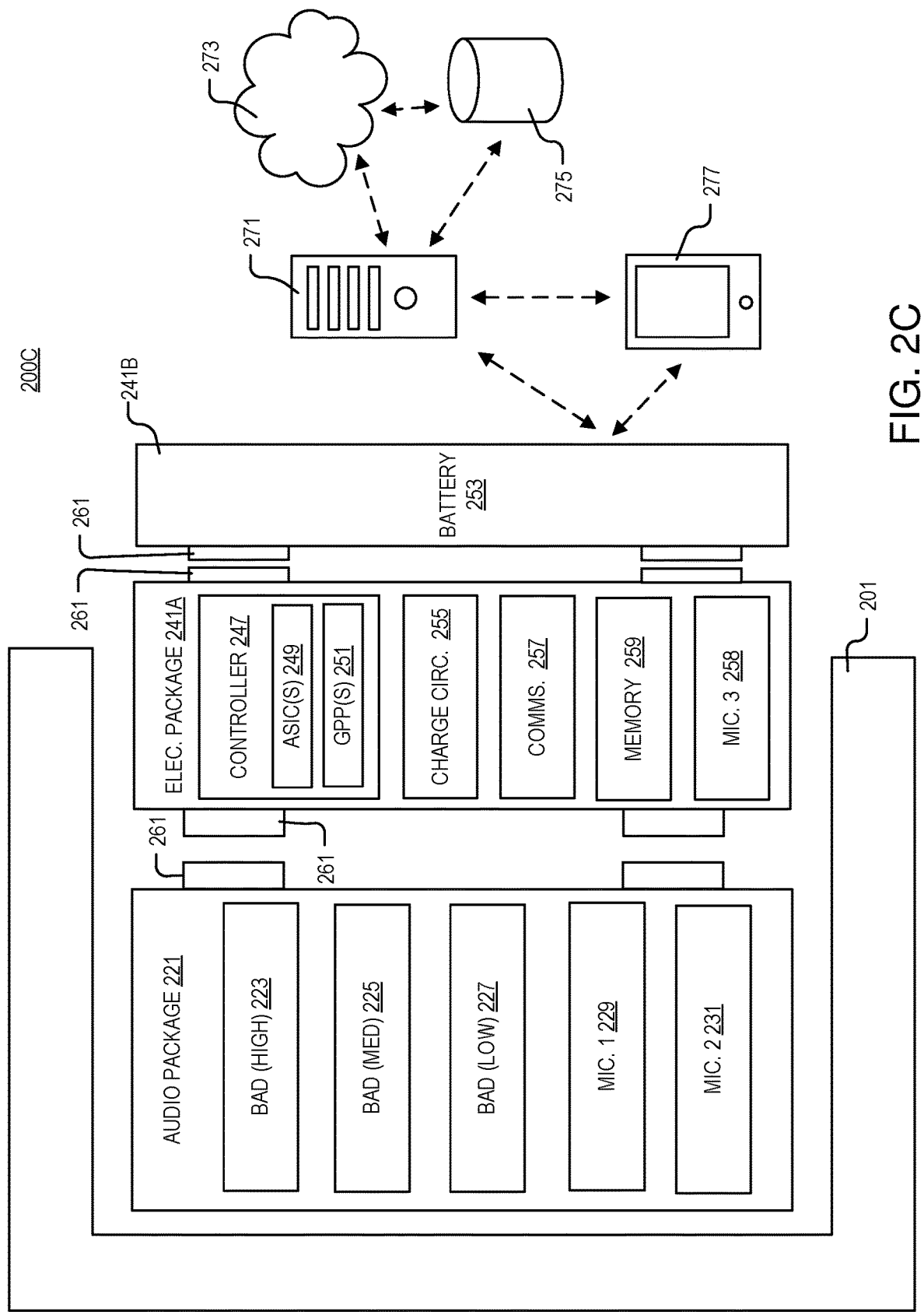
FIG. 2C illustrates a block diagram of the modular in-ear device of FIG. 2A, in accordance with an embodiment of the disclosure.

FIG. 2C illustrates another block diagram of the modular in-ear device of FIG. 2A (with optional battery package 241B), in accordance with an embodiment of the disclosure. As depicted, FIG. 2C illustrates many of the same components as FIG. 2B, which are numbered accordingly. In the depicted embodiment, battery package 241B (including battery 253—which in some embodiments, may be the only component in battery package 241B) is separable from the electronics package 241A and may be separately charged with a charging system (see e.g., charging system in FIG. 3A which may receive the coin shaped battery packages 241B). Accordingly, the device depicted in FIG. 2C is a four-piece device. Battery package 241B may attach to electronics package 241A via electrode interference fit, magnetic attachment, or the like. It is appreciated that any number of components may modularly attach together to form the in-ear device, in accordance with the teachings of the present disclosure.

FIGS. 3A-3C illustrate a system 300, or part of a system, for charging the battery packages 241A and 241B included in the in-ear device of FIGS. 2A-2C, in accordance with an embodiment of the disclosure. FIG. 3A depicts an isometric view of system 300, including housing 380 with lid 381 and body 391. In the depicted embodiment, the housing (e.g., a plastic or metal case including body 391 and lid 381) has a length, a width, and a height, and the length is greater than the width, and the height is greater than the length (when lid 381 is closed). Hinge system 388 attaches lid 381 to body 391 along the width of housing 380 to open and close lid 381. Charging unit 387 (e.g., a plastic or metal insert containing its own battery—battery 399 (e.g., a lithium ion battery, or the like) from FIG. 3B—for charging battery packages 341), is shaped to fit into body 391 of housing 380. One or more slots (depicted here with battery packages 341 disposed in the slots) are disposed in body 391 and are exposed when lid 381 is open. As shown, the slots are shaped to receive one or more of the in-ear device battery packages 341. The one or more slots in body 391 may have exposed electrodes (see e.g., electrode 361 on charging unit 387 in FIG. 3C) to charge the one or more in-ear device battery packages 341 with energy stored in battery 399. It is appreciated that battery 399 may have a greater energy storage capacity than one or more in-ear device battery packages 341. This way battery 399 can be used to recharge many of in-ear device battery packages 341 before battery 399 in body 391 needs to be recharged. Since only the battery packages 341 (and not the entire speaker device/headphone) is charged, there is limited interruption to the user, since the user can continue listening to music once they swap battery packages 341 (rather than having to wait until the entire headphone recharges).

In various embodiments, battery package 341 has a capacity ranging from 50 mAh to 500 mAh and is capable of supporting multiple hours of operational runtime (e.g., 2 to 20 hours) to the modular in-ear device. Of course, other battery capacities may be implemented. In one embodiment, the charge time of a given battery package 341 is less than the operational runtime provided by the battery package, such that a given battery package 341 has sufficient time to fully charge when swapped with another battery package 341. In this example, battery package 341 with a 2-hour operational runtime would preferably charge in under two hours. Ideally, the electronics for charging a 2-hour runtime battery package 341 would be selected to charge in 15 minutes, though embodiments disclosed herein are not so limited. Correspondingly, battery 399 within charging unit 387 should store sufficient energy to provide multiple charge cycles to battery packages 341. In one embodiment, battery 399 is sized to provide enough charge cycles to battery packages 341 to provide expected operational runtime for at least a 24-hour period. In one embodiment, battery 399 is sized to support seven days worth of expected charge cycles to battery packages 341.

As shown, one or more in-ear device battery packages 341 have a substantially circular cross section, and the one or more slots have a substantially semicircular cross section to receive the one or more in-ear device battery packages 341. In some embodiments, charging unit 387 removably fits into the body 391 of housing 380. Put another way, charging unit 387 may be removed from housing 380 (see e.g., FIG. 3C) such that charging unit 387 may be put in a variety of different cases/housings 380 so the user can customize their housing 380 (e.g., the user may select from, brushed aluminum, etched aluminum, graphics on the side of the housing, etc.).

In the depicted embodiment, removing the one or more charged packages 341 from the charging system may include partially lifting the one or more battery packages from the one or more slots with a slider apparatus 392 (e.g., which includes a small rod or lever to push battery packages 394 out of the slots to be easily grabbed by the user).

FIG. 3B shows a cross section of the charging system 300 of FIG. 3A, in accordance with the teachings of the present disclosure. As shown, the one or more slots include at least one of retention springs (e.g., bent metal that hold battery package 341 into the slots) or retention magnets (e.g., magnets that are attracted ferrous metal in battery package 341) to hold the one or more in-ear device battery packages 341 in the slots. It is appreciated that (first) slots are disposed in body 391 and have first retention springs/magnets 395, and (second) slots are disposed in an insert 383 shaped to fit into lid 381 and have second retention springs/magnets 393. First retention springs 395 or first retention magnets 395 apply a stronger force to the one or more in-ear device battery packages 341 than second retention springs 393 or second retention magnets 393. Thus battery packages 341 are held in body 391 (not the lid) when lid 381 is opened. Put another way, battery packages 341 are transferred to slots in body 391 from the slots in the lid 381, when the lid is closed by the user.

Battery 399 is disposed in charging unit 387 (e.g., a plastic or metal case that includes battery 399; electrodes 361; charging circuitry 397A/397B to charge battery 399; control circuitry 398, like a microcontroller or ASIC, to control charging of battery packages 341 and detect when battery packages 341 are disposed in the slots; and semicircular recesses for battery packages 341). Control circuitry 398 may be programmed (e.g., in software, hardware, or a combination thereof) with instructions to control charge delivered from battery 399 to battery packages 341, detect when battery packages 341 are in their respective slots, and when to initiate charging (e.g., when lid 381 is closed). Charging circuitry 397A/397B is disposed in charging unit 387 to charge battery 399, and charging circuitry 397A/397B includes at least one of a direct electrical connection 397A (depicted as a micro USB or other port) or wireless charging 397B (e.g., inductive charging loop, or the like). Wireless charging can be completed by putting the inductive charging loop 397 near an oscillating EM field to generate electricity.

FIG. 3C shows an exploded view of the components that are inserted into the housing 380 to form system 300. Put another way, housing 380 is removed in the depicted embodiment, so charging unit 387 and lid insert 383 are more clearly illustrated. As shown, the slots in the body are formed by a semicircular cutout in charging unit 387 (which is walled on one side by the housing 380). Similarly, slots are formed in lid 381 by semicircular cutouts in lid insert 383 (which are walled on one side by housing 380). Similarly retention springs/retention magnets 393/395 are disposed in recesses in the lid insert 383 and the charging unit 387.

In the depicted embodiment, the one or more slots may have a non-uniform cross section to insure proper placement of the battery packages 341 in the slots. As shown (in the exploded top-down view—see dashed line box), the slot and battery package 341 may have a trapezoidal cross section to ensure battery package 341 is inserted in the correct orientation into the slot to make contact to charging electrodes

361. As shown, the one or more slots include electrodes 361 coupled to contact the one or more in-ear device battery packages 341 regardless of the orientation of the one or more in-ear device battery packages 341 disposed in the one or more slots. Put another way, no matter how battery packages 341 are inserted into the slots, electrodes 361 on battery packages 341 and electrodes 361 disposed on the charging unit 387 will make contact. Here, the electrode 361 on the battery includes a circular strip of metal, and the electrode 361 on charging package 387 is positioned to always be in contact with the circular strip of metal no matter how the battery is rotated in the slot. This ensures continual charging while battery package 241 is in the slot. In some embodiments, wireless charging techniques (such as inductive loops, optical, or the like) may be used to charge battery packages 341. For example, inductive charging loops may be disposed in battery packages 341 and in charging package 387 to charge battery packages 341.

It is appreciated that in some embodiments, both charging unit 387 (disposed in body 391) and the insert 383 (disposed in lid 381) may be removed from housing 380. In some embodiments, there may be small tabs that the user can grasp to allow the user to remove charging unit 387 and insert 383 from casing 380. Thus, the user can change casing 380 whenever they feel, for aesthetic or other purposes.

Figure 4:
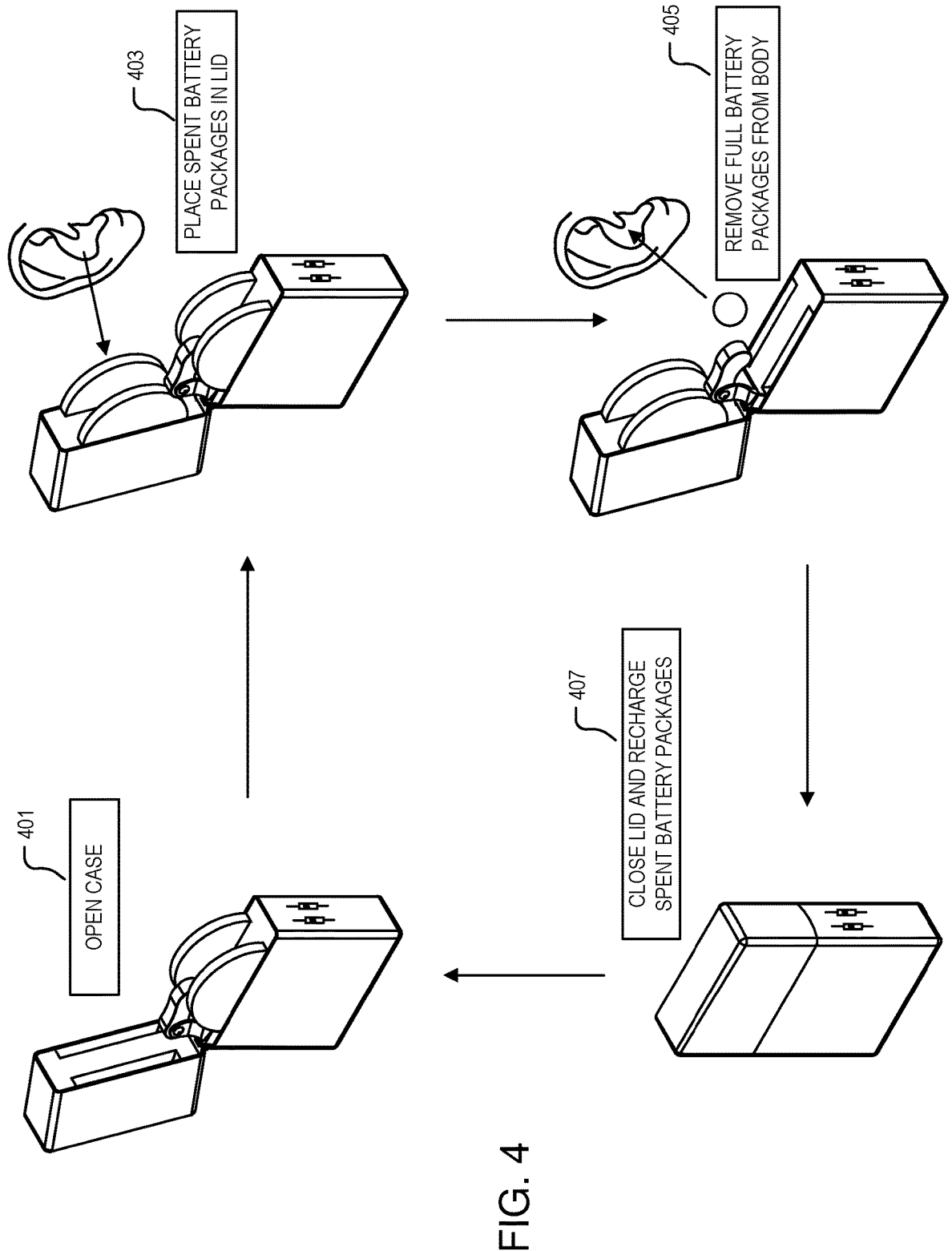
FIG. 4 illustrates a method of using an in-ear device, in accordance with an embodiment of the disclosure.

FIG. 4 is a method 400 of using an in-ear device (e.g., the in-ear device depicted in FIGS. 2A-2C), in accordance with an embodiment of the disclosure. One of ordinary skill in the art will appreciate that figures and blocks 401-407 may occur in any order and even in parallel. Additionally, figures and blocks may be added to, or removed from, method 400, in accordance with the teachings of the present disclosure.

Block 401 shows opening the case to expose two fully (or partially) charged battery packages. In the depicted embodiment, the body and lid of the housing open along a width of the case.

Block 403 depicts removing one or more battery packages (which may be "spent" or have little charge left) from an in-ear device (here the rest of the modular device is disposed in the ear when the battery packages are removed). The user places the one or more battery packages into (second) one or more slots disposed in the lid of the housing. The second slots are disposed in an insert (e.g., a piece of plastic that has been shaped to removably fit in the lid) in the lid give the user a place to put the spent battery packages when the user removed them from their ears, instead of having to fumble around with both fully charged and spent battery packages at the same time.

Block 405 depicts removing one or more charged battery packages from (first) one or more slots disposed in the charging unit, which is positioned in the body of the housing. The user places the one or more battery packages from the first one or more slots into the modular in-ear device in the user's ear. In some embodiments, removing the one or more charged packages from the charging system may include partially lifting the one or more battery packages from the one or more slots with a slider apparatus. Put another way, the user may press up on one of the two sliders depicted, and a portion of the slider my press up on the battery packages, slightly lifting one from inside the housing. Thus, the user can easily grab the battery packages one at a time, despite the relatively small amount of room for the user's fingers to grab the package. It is appreciated that in some embodiments the battery packages may be the size of a small coin (e.g., US nickel or penny).

Block 407 shows closing the lid to move the battery packages from the (second) slots in the insert in the lid into the (first) slots disposed in the charging unit to receive the charge from the battery. Put another way, by closing the lid the spent/empty battery packages are transferred into the first slots, which have circuitry to charge the battery packages. This may be accomplished by stronger springs/magnets in the charging unit holding the battery packages in the charging unit. The (second) slots in the lid may hold the battery packages without springs/magnets, or with weaker springs/magnets than the springs/magnets in the charging unit. Thus, when the lid is closed the battery packages are transferred to the charging unit, and held by the stronger springs/magnets in the charging unit. The force exerted by the stronger springs/magnets may still be weak enough for the user to remove the battery packages simply by the user pulling on the battery packages or pressing up on the sliders. Once the battery packages for the in-ear devices are charged again, they can be swapped for spent battery packages in the ears of the user and the method repeats. It is appreciated that once the battery inside the charging system is depleted, the user may charge the battery by plugging in the case (e.g., with a port disposed in the bottom of the case) or wirelessly charging the case (e.g., with an inductive loop or the like).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for charging in-ear device battery packages, comprising:
   a housing including a lid and a body;
   a hinge system attaching the lid to the body;
   a charging unit shaped to fit in the body, including:
   a battery shaped to fit in the body;
   one or more slots disposed in the body that are exposed when the lid is open and shaped to receive one or more of the in-ear device battery packages and charge the one or more in-ear device battery packages with energy stored in the battery when the lid is closed; and wherein the one or more in-ear device battery packages includes at least one of a controller, communication circuitry, one or more electrodes, or memory.

2. The system of claim 1, wherein the battery has a greater energy storage capacity than the one or more in-ear device battery packages.

3. The system of claim 1, wherein the one or more in-ear device battery packages have a substantially circular cross section, and the one or more slots have a substantially semicircular cross section to receive the one or more in-ear device battery packages.

4. The system of claim 1, wherein the charging unit removably fits into the body of the housing.

5. The system of claim 1, wherein the one or more slots include at least one of first retention springs or first retention magnets to hold the one or more in-ear device battery packages in the one or more slots.

6. The system of claim 5, further comprising an insert shaped to fit into the lid including one or more second slots shaped to receive the one or more in-ear device battery packages, wherein the one or more second slots include at least one of second retention springs or second retention magnets, wherein the first retention springs or first retention magnets apply a stronger force to the one or more in-ear device battery packages than the second retention springs or the second retention magnets.

7. The system of claim 1, further comprising charging circuitry disposed in the charging unit to charge the battery, wherein the charging circuitry includes at least one of a direct electrical connection or wireless charging.

8. The system of claim 1, wherein the one or more slots have a non-uniform cross section to ensure proper placement of the one or more in-ear device battery packages in the one or more slots.

9. The system of claim 1, further comprising a slider apparatus disposed in the body to lift the one or more in-ear device battery packages partially out of the one or more slots.

10. The system of claim 1, wherein the one or more slots include electrodes coupled to contact the one or more in-ear device battery packages, and wherein the electrodes are positioned to contact the one or more in-ear device battery packages regardless of an orientation of the one or more in-ear device battery packages disposed in the one or more slots.

11. The system of claim 1, wherein the one or more in-ear device battery packages include a second battery.

12. The system of claim 1, wherein the housing has a length, a width, and a height, and wherein the length is longer than the width, and wherein the hinge system attaches to the body and the lid along the width of the housing.

13. The system of claim 1, further comprising control circuitry, disposed in the charging unit, including instructions that when executed by the control circuitry, cause the control circuitry to perform operations including:

controlling a rate of charge of the in-ear device battery packages.

14. A method, comprising:

removing one or more battery packages from an in-ear device;

placing the one or more battery packages into one or more slots disposed in a housing, wherein the housing includes a lid and a body, and a charging unit shaped to fit in the body, and wherein placing the one or more battery packages into the one or more slots includes placing the one or more battery packages into first one or more slots disposed in an insert shaped to fit into the lid; and closing the lid to supply charge to the one or more battery packages.

15. The method of claim 14, further comprising:

removing one or more battery packages from second one or more slots, included in the one or more slots and disposed in the charging unit; and placing the one or more battery packages from the second one or more slots into the in-ear device.

16. The method of claim 15, further comprising partially lifting the one or more battery packages from the second one or more slots with a slider apparatus prior to removing the one or more battery packages.

17. The method of claim 15, wherein closing the lid causes the one or more battery packages to be transferred from the first one or more slots in the insert into the second one or more slots disposed in the charging unit to receive the charge from the battery.

18. The method of claim 14, wherein the one or more slots include at least one of first retention springs or first retention magnets to hold the one or more battery packages in the slots.

* * * * *